Patented Dec. 4, 1945

2,390,346

UNITED STATES PATENT OFFICE 2,390,346

ART OF MAKING DEEP DRAWING STEEL

Clyde E. Bayer, Steubenville, Ohio, and Charles E. Carr, Marland Heights, W. Va., assignors to National Steel Corporation, a corporation of Delaware No Drawing. Application March 25, 1942, Serial No. 436,188

4 Claims. (Cl. 75—46)

This invention relates to improvements in the art of making steel wherein blast furnace iron is treated in a Bessemer converter to reduce the carbon content and the resulting blown metal charged to an open hearth furnace.

In the usual plants utilizing a duplex operation a large proportion of the total blast furnace iron produced goes into Bessemer iron. Due to this fact the composition of the blast furnace iron is controlled to give good Bessemer steel. To this end the ore charged to the blast furnace is necessarily maintained low in phosphorus content and the silicon is maintained high to produce the necessary heat in the converter. Both these essential requirements raise the operating cost. Low phosphorus ore is more expensive and to obtain high silicon content in the cast iron requires running the blast furnace hot, necessitating the use of larger amounts of coke.

The present inventors have discovered a process especially suitable to a plant in which all of the blast furnace iron is eventually sold as open hearth product. The composition of their blast furnace iron is designed to be suitable for scrap heat open hearth operation or for their improved process in which some of the blast furnace iron is first blown in the converter and finished in the open hearth. The amount of silicon necessary in the present process is reduced by taking the iron in the blowing step down to between 2.5% and 1% carbon content. At these carbon contents the final temperature of the blow is maintained sufficiently high by the smaller amount of silicon present. Turning down the converter with the carbon content in the blown iron relatively high avoids slopping troubles due to the low silicon to maganese ratio used in the present process. Since all the blast furnace iron is eventually finished in the open hearth, the phosphorus content can remain high in the blast furnace iron so long as the proper working is given in the open hearth. To accomplish this purpose the applicants' process contemplates the use of raw limestone in the open hearth together with the usual open hearth working to reduce the high phosphorus content to a desirable value. As is well known, in the blowing process the blown metal accumulates nitrogen with the result that most Bessemer steel and duplex products contain a high nitrogen content. In the applicants' process the blown iron picks up a minimum of about .010 nitrogen but proper treatment in the open hearth including the turbulence of the lime boil reduces the nitrogen content of the applicants' product to such a point that the resulting product can be used as a deep drawing steel. This latter achievement has never before been consistently reached in duplex practice.

By maintaining the silicon content of the blast furnace iron relatively low, the blast furnace can be operated more economically. By allowing the phosphorus content in the blast furnace iron to be high, cheaper grades of ore can be used. The present inventors maintain the amount of manganese in the blast furnace iron as high as possible consistent with a satisfactory slag formation in the converter in order that the blast furnace iron shall be highly satisfactory for use in the usual scrap heat open hearth operations. If the manganese content is raised too high relative to the silicon content, the converter slag becomes too fluid which makes its segregation difficult when the converter is turned down. If some of this slag, which is high in silicon, reaches the open hearth objectionable open hearth slag reactions take place, resulting in less ready economic operation or else less reduction in the phosphorus content of the tapped steel.

By utilizing their specific blast furnace iron to arrive at molten blown metal as the charge to the open hearth the applicants have found that they reduce the amount of scrap required to about 20% or 25% of the metal charged to arrive at a desired deep drawing steel product with an open hearth working time about half that required when scrap and molten blast furnace iron are charged. The process can be operated with no scrap but this is not the preferred manner as pointed out hereunder.

An important object of the present invention is the provision of a process of producing deep drawing steel using relatively low grade ore, economical blast furnace operation and low working time.

Another important object of the present invention is the provision of a process for producing steel with low nitrogen content using blown metal.

A further important object of the present invention is the provision of a process of making deep drawing steel requiring a small amount of scrap and a relatively short working period.

A further important object of the invention is to obtain a deep drawing steel from an improved process utilizing blown metal from blast furnace iron suitable for normal scrap heat open hearth operation.

In the present process an ore mixture is charged to the blast furnace such that the phosphorus content in the blast furnace irons runs around .30% and the manganese between .90% and 1.30%. The phosphorus content may run as high as .34% and in some cases as low as .25%. No special ores are required to obtain these phosphorus and manganese contents, the average American low grade ore being suitable. The coke in the blast furnace charge is maintained in such quantity that the resulting blast furnace temperature results in an iron with silicon content of between .90% and 1.25%. Such operation is about the same as that usually employed to turn out blast furnace iron for charging to the usual basic open hearth process. The amount of silicon is much lower than that used in blast furnace iron to be charged to the usual Bessemer or duplex. By maintaining the silicon content down the blast furnace iron of the present invention is suitable for charging directly to the basic open hearth process or to the converter for the applicants' improved process. In the latter the silicon content taken with the manganese is sufficient to furnish the heat in the blowing step, some scrap occasionally being necessary in the converter to reduce the blowing temperature of the metal since too high an initial blowing temperature may result in reduction of the carbon without reducing the silicon. The silicon present is sufficient or more so for the purpose of heat supply because the applicants do not blow the iron below 1% carbon and usually reduce the carbon content to between 2.5% and 1%. The silicon is reduced to from .01% to .05% and the manganese from .10% to .35%. In the applicants' process the blown metal is charged to an open hearth to which raw limestone and some scrap has already been charged. In a sample heat the open hearth was prepared with about 20,000 pounds of limestone and 60,000 pounds of cold scrap. About 360,000 pounds of molten blown metal was charged to the furnace, the high temperature of the blown metal rapidly melting the scrap. The resulting heat was worked in the open hearth for about 8½ hours and included a good lime boil. The heat was tapped when the phosphorus content reached about .012%, although a content as low as .008% is sometimes reached. At the tapping point the nitrogen content had been reduced to about .004%. The excellent nitrogen reduction in the heats made in accordance with the applicants' invention as compared to the duplex process appears to be determined by the action of the lime boil and carbon removal throughout the heat. A reason for this phenomenon presents itself in the fact that the calcining of the lime and oxidation of the carbon form bubbles of carbon monoxide which are entirely free from nitrogen. These bubbles in their passage through the liquid steel bath will pick up nitrogen from the steel until the partial pressure of nitrogen in the gaseous mixture forming a bubble is in equilibrium with the concentration of nitrogen in the steel. The removal of nitrogen in the open hearth would thus seem to be determined by the weight of carbon monoxide gas generated, the generation of this gas in turn depending on the raw limestone and meltdown carbon. In duplexing operations speed is essential, the blown metal being normally treated in the open hearth from two to four hours. For this reason low phosphorus iron is deemed essential. A lime boil is avoided since the use of raw limestone for the purpose of obtaining a lime boil would require substantial increase in time. As a result the presence of nitrogen in amounts of above .007% was believed to be an inherent feature of duplex steels. Nitrogen in these proportions makes a steel unsatisfactory for deep drawing purposes, the nitrogen causing age hardening. In the applicants' product the nitrogen content ranges from .003% to .005%.

The time for blowing varies with conditions but averages about 12 minutes. Although in the present invention the converter is turned down while the carbon content of the blown metal is still high, no objectionable kidney formations are encountered although this appears to be a common disadvantage in duplex processes.

Proper control of the silicon to manganese ratio in the blast furnace iron gives a slag in the converter sufficiently viscous to allow for its ready separation when the blown metal is poured. Great care must be exercised to prevent blast furnace slag from being carried over to the converter since the applicants have found that small quantities of such slag cause excessive slopping in the converter.

In applicants' improved process the meltdown carbon can be maintained high because the lime boil essential to the elimination of the nitrogen affects the reduction of the carbon to the proper melt-out content. When raw limestone and blown metal form the heat in the present process, the meltdown carbon content is highest and depends entirely on how low in carbon content the iron is blown in the converter. The addition of scrap up to the maximum preferred proportion reduces the meltdown carbon until a point is reached at which the time required for charging and melting the scrap becomes too high. Additionally, the smaller amount of meltdown carbon reduces the amount of carbon monoxide gas formed from the carbon dioxide released in calcining of the limestone and thereby reduces the amount of gas evolved for removing the objectionable nitrogen from the metal. At this point the amount of lime necessary to take care of the high phosphorus content in the present process, when in the form of limestone, may result in reducing the carbon content too low for the desired melt-out value. Applicants have found that a proportion of scrap to blown iron in the heat of about 1 to 3 produces a heat which gives an economic treating period in the open hearth. Reducing the scrap so that the proportion of scrap to blown iron in the heat is lower than about 1 to 6 lowers the charging time, but under some conditions the higher meltdown carbon and total phosphorus may result in a less desirable process.

We claim:

1. An improved process for making deep drawing steel comprising the steps of blowing a blast furnace iron in a converter to produce a blown iron of from 1.00% to 2.50% carbon, charging an open hearth furnace with lime in the form of raw limestone, charging the blown iron to the open hearth furnace to comprise a heat, treating the heat in the open hearth furnace to obtain a good lime boil, said raw limestone charged being in amount such that the calcination thereof during the lime boil acting with the carbon in the heat will evolve sufficient carbon containing gas to reduce the nitrogen in the heat to a maximum of about .005%, working the heat to obtain a maximum phosphorus content of about .012% and then tapping the heat.

2. An improved process in accordance with claim 1 in which scrap is charged to the open hearth prior to the introduction of blown metal, the proportion of scrap to blown iron in the heat being from about 1 to 3 to about 1 to 6.

3. An improved process for making deep drawing steel comprising the steps of blowing a blast furnace iron having a silicon content between about .90% to 1.25% and a manganese content between about .90% to 1.30% and a minimum of about .25% phosphorus in a converter to produce a blown iron of from 1.00% to 2.50% carbon and more than about .010% nitrogen, charging an open hearth furnace with lime in the form of raw limestone and with scrap, charging the blown iron to the open hearth furnace to form a heat, the proportion of scrap to blown iron in the heat being from about 1 to 3 to about 1 to 6, the amount of said lime charged being about 5% of the heat, treating the heat in the open hearth furnace to obtain a good lime boil, working the heat to obtain a maximum phosphorus content of about .012%, and then tapping the heat to obtain a deep drawing steel having a nitrogen content below about .005%.

4. An improved process for making deep drawing steel comprising the steps of blowing a blast furnace iron having a silicon content between about .90% to 1.25% and a manganese content between about .90% to 1.30% and a minimum of about .25% phosphorus in a converter to produce a blown iron of from 1.00% to 2.50% carbon and more than about .010% nitrogen, charging an open hearth furnace with lime in the form of raw limestone and with scrap, charging the blown iron to the open hearth furnace to form a heat, the proportion of scrap to blown iron in the heat being from about 1 to 3 to about 1 to 6, treating the heat in the open hearth furnace to obtain a good lime boil, the amount of limestone charged being such that the calcination thereof during the lime boil acting with the carbon in the heat will evolve sufficient carbon containing gas to reduce the nitrogen in the heat to a maximum of about .005%, working the heat to obtain a maximum phosphorus content of about .012% and then tapping the heat.

CLYDE E. BAYER.
CHARLES E. CARR.